US007801793B2

(12) United States Patent
Wiesehuegel et al.

(10) Patent No.: US 7,801,793 B2
(45) Date of Patent: Sep. 21, 2010

(54) USER-SPECIFIED TIME-BASED PROXY FIRING IN ONLINE AUCTIONS

(75) Inventors: Leland James Wiesehuegel, Austin, TX (US); Rebecca Lynn Roberts, Austin, TX (US); Keith Ky Trieu Ho, Austin, TX (US); Ernest Bracamontez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2082 days.

(21) Appl. No.: 09/821,106

(22) Filed: Mar. 29, 2001

(65) Prior Publication Data

US 2002/0188545 A1 Dec. 12, 2002

(51) Int. Cl.
*G06Q 40/00* (2006.01)
(52) U.S. Cl. .......................................... 705/37; 705/36
(58) Field of Classification Search ............. 705/36–37, 705/38
See application file for complete search history.

(56) References Cited

U.S. PATENT DOCUMENTS

| | | | |
|---|---|---|---|
| 4,799,156 A | 1/1989 | Shavit et al. | |
| 4,984,155 A | 1/1991 | Geier et al. | |
| 5,117,354 A | 5/1992 | Long et al. | |
| 5,117,355 A | 5/1992 | McCarthy | 364/405 |
| 5,136,501 A | 8/1992 | Silverman et al. | |
| 5,154,738 A | 10/1992 | Armstrong | |
| 5,303,379 A | 4/1994 | Khoyi et al. | |
| 5,319,542 A | 6/1994 | King, Jr. et al. | |
| 5,424,944 A | 6/1995 | Kelly et al. | |
| 5,640,569 A | 6/1997 | Miller et al. | |
| 5,799,157 A | 8/1998 | Escallon | |
| 5,835,896 A | 11/1998 | Fisher et al. | |
| 5,870,719 A | 2/1999 | Maritzen et al. | |
| 5,897,639 A | 4/1999 | Greef et al. | |

(Continued)

FOREIGN PATENT DOCUMENTS

WO   WO 00/39735   7/2000

OTHER PUBLICATIONS

Definition of "proxy" and "proxy server", Microsoft Computer Dictionary, 5th Edition, 2002, p. 428.*

(Continued)

*Primary Examiner*—Thu Thao Havan
(74) *Attorney, Agent, or Firm*—Robert H. Frantz; David A. Mims, Jr.; William H. Steinberg (57) ABSTRACT

Delay-paced online proxy bidding by providing a counter bid delay value parameter for automatic proxy bidding on behalf of a user in an online auction; automatically checking by an application server a current bid level of the online auction having a plurality of bids from other participants separated in time to form a bidding pace; determining by an application server that any a proxy condition has been met; and placing by an application server computer a counter bid the auction responsive to the proxy conditions being met and a time following or upon the elapse of a counter bid delay from a time of placement of the current bid; wherein the automatic checking, determining and placing counter bids produce a delay paced online proxy bidding according to the counter bid delay value and wherein escalation of the pace of bidding within the auction system is avoided.

12 Claims, 6 Drawing Sheets

U.S. PATENT DOCUMENTS

| | | |
|---|---|---|
| 5,924,083 A | 7/1999 | Silverman et al. |
| 5,950,173 A | 9/1999 | Perkowski |
| 5,999,915 A | 12/1999 | Nahan et al. |
| 6,006,201 A | 12/1999 | Berent et al. |
| 6,012,045 A | 1/2000 | Barzilai et al. |
| 6,023,686 A | 2/2000 | Brown |
| 6,029,160 A | 2/2000 | Cabrera et al. |
| 6,032,145 A | 2/2000 | Beall et al. |
| 6,044,363 A | 3/2000 | Mori et al. ............... 705/37 |
| 6,055,518 A | 4/2000 | Franklin et al. |
| 6,058,379 A | 5/2000 | Odom et al. |
| 6,085,169 A | 7/2000 | Walker et al. |
| 6,108,639 A | 8/2000 | Walker et al. ............ 705/26 |
| 6,131,087 A | 10/2000 | Luke et al. ............... 705/26 |
| 6,134,534 A | 10/2000 | Walker et al. ............ 705/26 |
| 6,147,686 A | 11/2000 | Brown et al. |
| 6,161,099 A | 12/2000 | Harrington et al. |
| 6,173,377 B1 | 1/2001 | Yanai et al. |
| 6,199,048 B1 | 3/2001 | Hudetz et al. |
| 6,199,050 B1 | 3/2001 | Alaia et al. |
| 6,216,114 B1 | 4/2001 | Alaia et al. |
| 6,272,472 B1 | 8/2001 | Danneels et al. |
| 6,389,402 B1 | 5/2002 | Ginter et al. |
| 6,415,269 B1 * | 7/2002 | Dinwoodie ............. 705/36 R |
| 6,449,601 B1 | 9/2002 | Friedland et al. |
| 6,453,325 B1 | 9/2002 | Cabrera et al. |
| 6,484,153 B1 | 11/2002 | Walker et al. |
| 6,505,172 B1 | 1/2003 | Johnson et al. |
| 6,532,481 B1 | 3/2003 | Fassett, Jr. |
| 6,535,880 B1 | 3/2003 | Musgrove et al. |
| 6,564,192 B1 | 5/2003 | Kinney et al. |
| 6,598,029 B1 | 7/2003 | Johnson et al. |
| 6,606,603 B1 | 8/2003 | Joseph et al. |
| 6,985,885 B1 | 1/2006 | Goldberg et al. |
| 7,475,009 B2 | 1/2009 | Ishikura et al. |
| 7,475,025 B2 | 1/2009 | Wiesehuegel et al. |
| 2001/0027431 A1 | 10/2001 | Rupp et al. |
| 2001/0032162 A1 | 10/2001 | Alsberg et al. |
| 2001/0047308 A1 | 11/2001 | Kaminsky et al. |
| 2002/0007318 A1 | 1/2002 | Alnwick |
| 2002/0038282 A1 * | 3/2002 | Montgomery ............ 705/37 |
| 2002/0059131 A1 | 5/2002 | Goodwin et al. |
| 2002/0059132 A1 | 5/2002 | Quay et al. |
| 2002/0082953 A1 | 6/2002 | Batham et al. |
| 2002/0128948 A1 | 9/2002 | Wiesehuegel et al. |
| 2002/0184084 A1 | 12/2002 | Lidow |
| 2003/0009392 A1 | 1/2003 | Perkowski |
| 2003/0051068 A1 | 3/2003 | Eldridge et al. |
| 2003/0083983 A1 * | 5/2003 | Fisher et al. ............. 705/37 |
| 2005/0234811 A1 | 10/2005 | Herman et al. |
| 2007/0055615 A1 | 3/2007 | Howell et al. |

OTHER PUBLICATIONS

Leszczyc, Peter T.L., and Gerald Häubl, Abstract of "Bidding Frenzy: Intensity of Competitive Interaction Among Bidders and Product Valuation in Auctions", see especially pp. 5-6. Retrieved on Jun. 25, 2008 from: www.business.ualberta.ca/ppopkowski/Papers/ACR%20SPECIAL%20SESSION%20SUMMARY.doc. Also available at http://www.acrwebsite.org/volumes/display.asp?id=7910 published in "Advances in Consumer Research", vol. 28, 2001, pp. 451-453.

Milgrom, Paul; "Putting Auction Theory to Work: The Simultaneous Ascending Auction"; see especially p. 4 lines 4-5 and p. 12 lines 30-38; retrieved on Jun. 25, 2008 from: http://www-econ.stanford.edu/faculty/workp/swp98002.pdf.

USPTO; PAIR Internet File Wrapper contents containing Office Actions, Applicant Replies and Amendments, Information Disclosure Statements, and Non-Patent Literature retrieved on Oct. 29, 2009 from U.S. Appl. No. 09/714,726, filed Nov. 16, 2000; now under allowance; pp. 1-476.

ILS BidQuest Clears Million-Dollar Mark; ILS Auction List Exceeds Six-Thousand Items; PR Newswire; New York: Nov. 7, 2000.

Ariba: Ariba Sourcing now available; Function-rich platform introduces RFQ-based procurement along commerce services network with enterprise and marketplace editions; M2 Presswire. Coventry: Sep. 12, 2000.

PurchasePro.com, Inc. Reports 109 Percent Sequential Revenue Growth for the Second Quarter of Fiscal 2000; [1] Business Editors. Business Wire. New York: Jul. 19, 2000.

Milgrom, Paul; "Putting Auction Theory to Work: The Simultaneous Ascending Auction", see especially p. 4 lines 4-5 and p. 12 lines 30 - 38; retrieved from http://www-econ.stanford.edu/faculty/workp/swp98002.pdf.

USPTO; compiled prosecution documents (Office Actions, Applicant Replies and Amendments, and Information Disclosure Statements) from U.S. Appl. No. 09/801,604, filed on Mar. 8, 2001; now abandoned; pp. 1-30.

USPTO; Public PAIR Internet File Wrapper contents containing Office Actions, Applicant Replies and Amendments, and Information Disclosure Statements retrieved on Oct. 29, 2009 from related U.S. Appl. No. 09/801,613, filed on Mar. 8, 2001; pp. 1-381.

USPTO; Public PAIR Internet File Wrapper contents containing Office Actions, Applicant Replies and Amendments, and Information Disclosure Statements retrieved on Oct. 28, 2009 from related U.S. Appl. No. 09/726,009, filed on Nov. 29, 2000; pp. 1-327.

USPTO; Public PAIR Internet File Wrapper contents containing Office Actions, Applicant Replies and Amendments, and Information Disclosure Statements retrieved on Oct. 28, 2009 from related U.S. Appl. No. 09/773,197, filed on Jan. 31, 2001; pp. 1-518.

* cited by examiner

Figure 1

*Prior Art*

Figure 2

My Offers

| Item | Part No. | Description | Qty. | My Bid per | Total Bid | Proxy Controls |
|---|---|---|---|---|---|---|
| 1 | XYZ-9 | 10GB hard disk drives,SCSI | 14 | $10.00 | $45.00 | max $45.00 until 4:00 PM, pace = 10 min; ... <more> |
| 2 | ABB-1 | floppy drives, USB | 4 | $17.00 | $68.00 | max $7.00 within 15 min of close; ... <more> |
| 3 | JKL-00 | scanner, EPP | 20 | $15.00 | $300.00 | no proxy |
| ... | ... | ... | ... | ... | ... | ... |
| N | MNOP | scanner, used | 10 | $10.00 | $100.00 | no proxy |

30 — (arrow)
31 (brace around table rows)
32 — My Bid per
33 — Total Bid
34 — Proxy Controls
35 — Submit Bid

USER-SPECIFIED TIME-BASED PROXY FIRING IN ONLINE AUCTIONS

CROSS-REFERENCE TO RELATED APPLICATIONS

Claiming Benefit Under 35 U.S.C. 120

This application is related to U.S. patent application Ser. Nos. 09/714,726 and 09/801,604 (to be amended when Serial Numbers are assigned), filed on Nov. 16, 2000 and Mar. 8, 2001, respectively by Leland James Wiesehuegel, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

This application incorporated by reference U.S. patent application Ser. Nos. 09/714,726 and 09/801,604 (to be amended when Serial Numbers are assigned), filed on Nov. 16, 2000 and Mar. 8, 2001, respectively by Leland James Wiesehuegel, et al., in their entirety, including figures.

BACKGROUND OF THE INVENTION

1. Field of the Invention

This invention relates generally to electronic commerce, to conducting a business-to-business interactive offer and bid collection over a computer network, and more specifically to technologies for automatically placing bids in an online offer or auction.

2. Description of the Related Art

Figure 1:
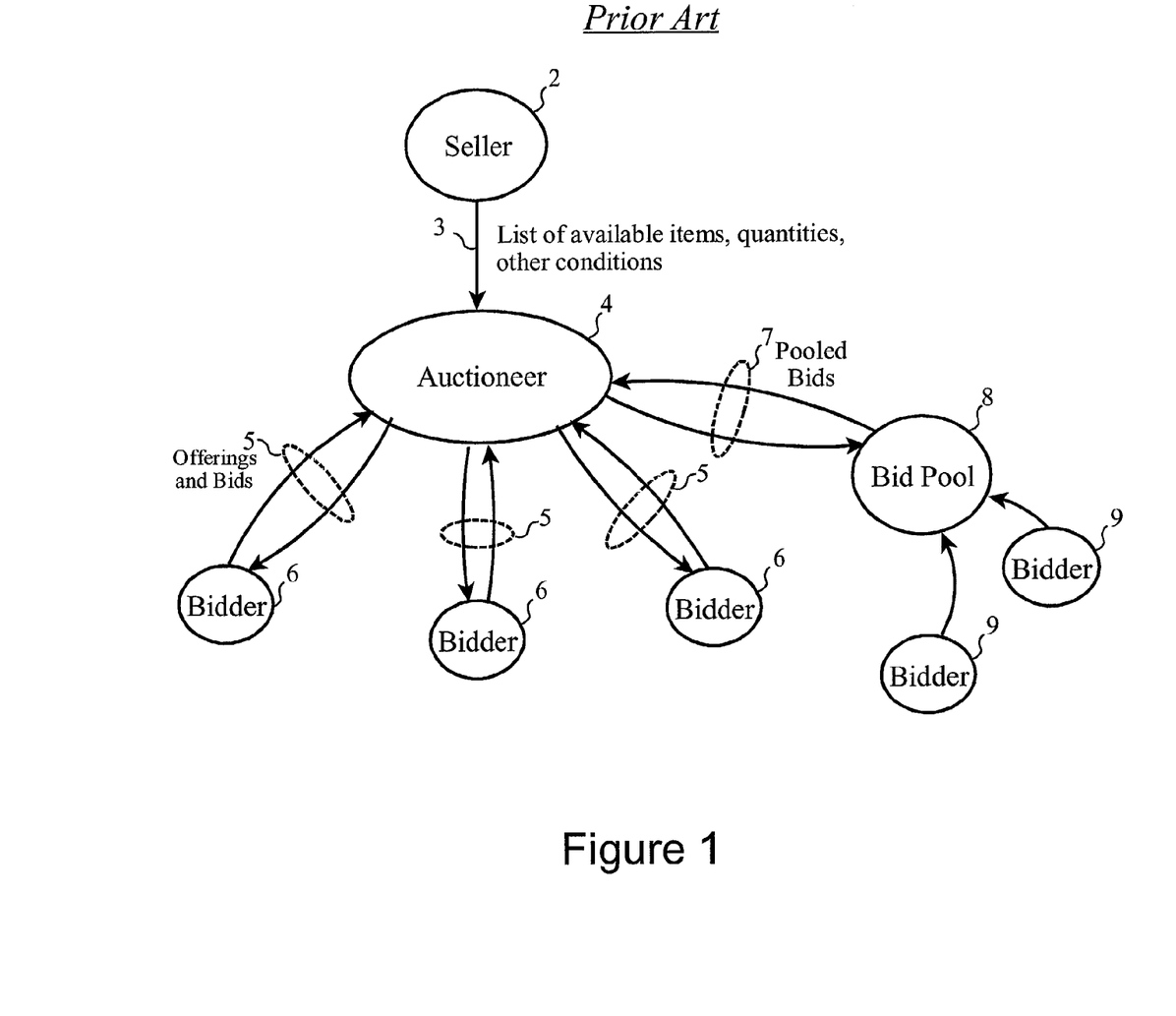
FIG. 1 discloses the well-known arrangement of sellers, auctioneers, and bidders.

Prior to the advent of electronic auctioning over computer networks or electronic commerce, auctions were held in a group of gathered bidders with an auctioneer. As shown in FIG. 1, an auction (1) is conducted on behalf of a seller (2) by an auctioneer (4). The auctioneer receives a list of items to be sold and possibly a minimum and/or reserve price for those items. During the auction, a plurality of bidders (6) place bids (5) under the guidance and control of the auctioneer (4). In some cases, multiple bidders (9) may pool (8) their bids, and the pooled bids (7) are submitted as a single bid with a combined quantity to the auctioneer (4).

The auctioneer enforces the rules of the auction, such as minimum bid price and quantities, minimum bid incrementing from the previous bid for a new bid, and time limits for placing bids. Auction bidders are typically qualified as to their ability to complete the purchase should their bid be the winning bid prior to entering the auction room.

Many online auctioning systems such as "priceline.com" have become very popular for individuals and businesses to use to take advantage of auctions at which they cannot be physically present. Such e-commerce auctions or online auctions are usually conducted over a specified period of time of opening and closing for bids, and are typically conducted under one of several well-known sets of rules or models. These common models include "Dutch" auctions, progressive auctions, "Yankee" auctions, single-bid auction, sealed bid auctions, reserve auctions, and hybrids of these types of auctions.

Figure 2:
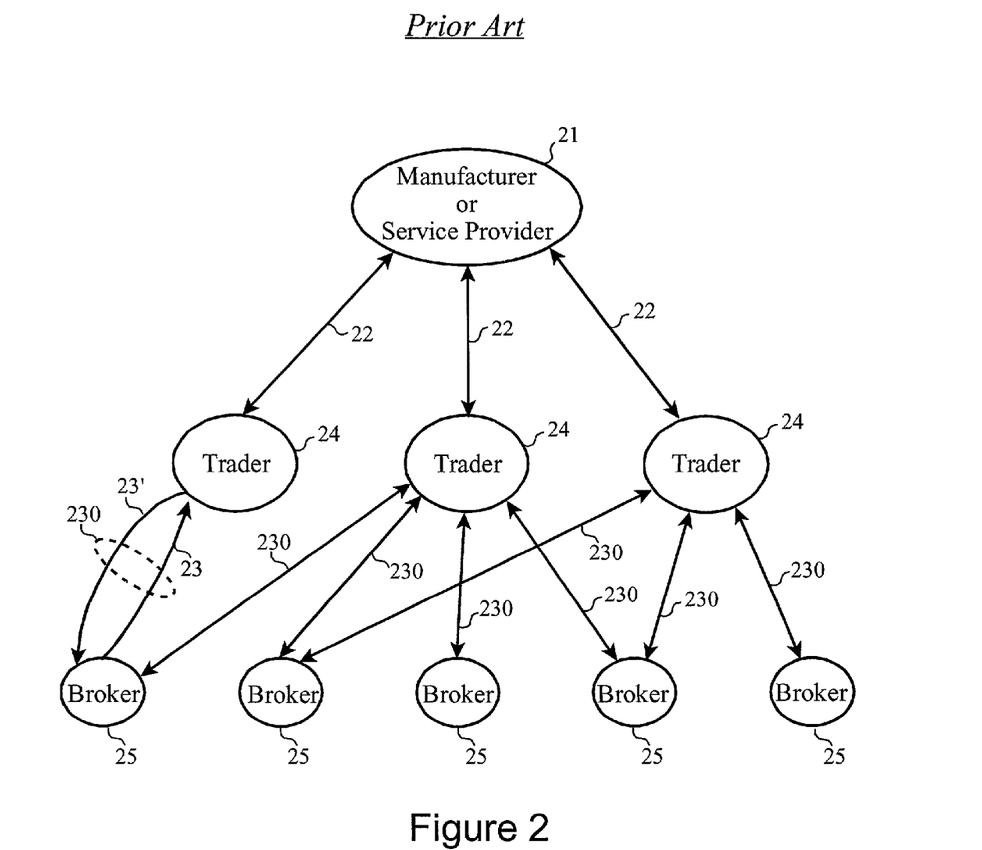
FIG. 2 shows the common business arrangement between manufacturers, service providers, traders, and brokers.

However, most sales offering and bid systems conducted by manufacturers of goods or service providers are conducted under a different set of procedures and processes. Turning to FIG. 2, a typical trader and broker system for offering and accepting bids is shown (20). In such a business-to-business ("B2B") offering and bidding process (20), a manufacturer or service provider (21) will notify one or more traders (24) of available products or services, quantities, and minimum acceptable bid values (22). The trader then provides offerings (23') to one or more brokers (25), to which the brokers may respond with bids (23).

In some cases, bids may be accepted for either partial lots or whole lots of offered products. These offerings (23) and the corresponding bids (23) are collected by the trader, and the trader (24) makes a decision of which bids to accept. The traders (24) subsequently respond to the manufacturer or service provider (21) with actual orders or purchases (22).

Although the B2B offering and bid acceptance process may be conducted similarly to an auction, it is not an auction in the strict sense in that the order fulfillment, or bid acceptance, process is conducted usually by the trader at his discretion. For example, under a typical auction process, the highest qualified bidder may be defined as the bid winner. However, in a B2B offering and bid collection system, the trader may favor the second or third highest bid over the highest bid for the fact that the broker placing the second or third highest bid has preferred business arrangements, such as a longer history of purchasing from the trader or a history of larger volume purchases with the trader.

Brokers typically buy on speculation, and sell to end users. Brokers may sell to multiple retailers of products or services, or they may represent a single large retailer of a product or service.

Traders are typically commissioned sales professionals, and the structure of their commissions may vary depending on the quantities and the commodities or category of products being sold.

A particular broker may receive offers from multiple traders who represent a particular manufacturer or service provider. For example, a broker that represents a chain of computer stores may receive computer memory offers from a first trader, software upgrade offers from a second trader, and peripheral offers from yet a third trader, all of whom represent the same manufacturer. In response, this broker may bid or place "offers" for products or services in different categories, and must submit those bids to different traders based on the traders' commodities or categories of products that each trader handles.

The related patent application disclosed an on-line B2B offer system which is suitable for presenting information to bidders and brokers for products and services on which they are entitled to bid. The online offer system of the related applications allow brokers to act as "bidders", and traders to act as "auctioneers" or "offerors", to draw an analogy to online auctioning systems, while simultaneously meeting the specific needs of B2B commerce transactions.

"Proxies" are a bidding option for participants in auctions and offers. For example, in a "real" auction, a participant may send an agent to the auction to place bids on his or her behalf. The participant may instruct the agent to counter bid all bids up to a maximum, but if the proxy maximum is reached, not to counter bid above the maximum. During the actual auction, the agent may submit bids to beat the highest current bid until his proxy limit is reached, at which time the agent would not bid further.

The related applications disclosed an online, business-to-business offering system which also provided a proxy agent function that allowed a participant to specify a maximum proxy value for the system to automatically execute on behalf of the participant. In this case, the software agent polls the current status of the bid level in a particular offer or auction, and immediately places a bid higher than the highest competitive bid until the proxy maximum has been reached.

While this is efficacious in many respects, especially by allowing the participant to automatically "top" the current bid while not being personally involved in the bid placing, it has some potential shortcomings. The most notable of which is the possibility that two (or more) automatic proxy agents may bid against each other, submitting increasing bids as quickly as possible given the computing and communications resources allow. Thus, the bidding would rapidly escalate until all but one of the proxy agent's maximum limit has been reached.

This is analogous to a very wealthy participant sending a agent to an auction with a very high proxy limit, and when the bidding opens, the agent quickly escalates the bidding to his maximum limit. This experience may be seen negatively by the other participants of the auction, taking much of excitement and sense of adventure out of the process for the losers. This can lead to dissatisfaction and disillusionment in the process itself, and these unsatisfied participant's may choose not to be involved in future auctions.

A "real" or live proxy agent usually understands this problem, and will conduct himself in a less conspicuous manner. For example, he may wait to sense the "pace" of the bidding, only placing higher bids after some delay has occurred from the last placed bid. Or, he may wait until a time near the closing of the auction to place a higher bid, allowing other participants to bid against each other during the interim. However, to date, this problem has not been addressed by online auction and offering systems.

Therefore, there is a need in the art for a system and method which allows a participant in an online auction or offering process to create a proxy agent with instructions for the pace, timing, and limits of automatic proxy bidding.

BRIEF DESCRIPTION OF THE DRAWINGS

The following detailed description when taken in conjunction with the figures presented herein provide a complete disclosure of the invention.

SUMMARY OF THE INVENTION

In an on-line auction or offering system, such as an online Dutch, Yankee, or Traditional (interactive) type of auction, delay-paced automatic proxy bidding is provided to a user according to a user-supplied counter bid delay value by automatically checking by an application server a current bid level of the online auction having a plurality of bids from other participants separated in time to form a bidding pace, determining by an application server that any a proxy condition has been met, and placing by an application server computer a counter bid the auction responsive to the proxy conditions being met and a time following or upon the elapse of a counter bid delay from a time of placement of the current bid, wherein the automatic checking, determining and placing counter bids produce a delay paced online proxy bidding according to the counter bid delay value and wherein escalation of the pace of bidding within the auction system is avoided.

This allows the user to automatically participate in the bidding throughout the entire process, but avoids automatic and rapid counter bidding by opposing proxy users.

DETAILED DESCRIPTION OF THE INVENTION

It will be recognized by those skilled in the art that certain combinations and integration of the features presented herein may be made without departing from the spirit and scope of the invention. Further, it will be recognized that many of the architectural details disclosed herein are disclosed under the inventor's preferred embodiment in order to enhance the robustness and reliability of the invention, but these details may not be necessary to realize the fundamental functionality of the invention.

Throughout the disclosure given herein and the following claims, the term "broker" is used to describe a bidding party or bidder, and the term "trader" is used to describe a party who conducts the process of promoting offers to bidding parties. This is nearly analogous to bidder and auctioneer in the context of a traditional auction, respectively, although the offering and bidding process provided by the invention may be used to conduct business-to-business offers as well as traditional types of auctions.

Even though the following description of the preferred embodiment is given relative to implementation as a feature of function in a specific interactive offering system, it will be recognized by those skilled in the art that the invention may be equally well implemented as a feature or function in conjunction with any on-line auction or offering system.

General Description of the Interactive Offering System

Figure 5:
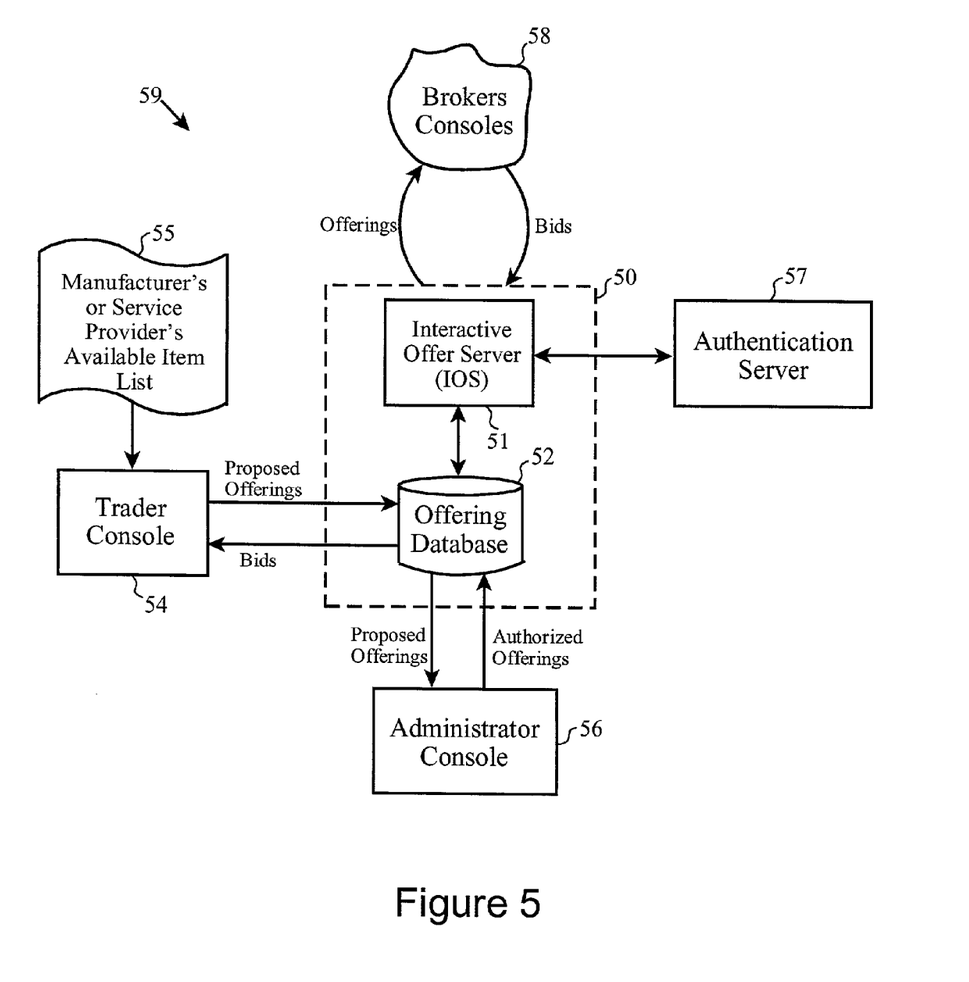
FIG. 5 shows a generalized system architecture of the invention.

The following general description of the Interactive Offering System ("IOS") is summarized from the related application. Turning to FIG. 5 in which the general architecture of the system of the preferred embodiment of the invention is shown, the Interactive Offer Server ("IOS") (51) is associated with an offering database (52). The offering system (50) is included in the larger architecture (59) which includes the brokers' consoles (58), the administrator console (56), and the traders' consoles (54). All consoles and the interactive offering server may communicate either as an integrated package within one computer system, or as separate computer systems integrated and communicating over a computer network such as the Internet.

In the general architecture of FIG. 5, the manufacturer or service provider's goods availability list (55) is received by the trader consoles (54). The trader then creates proposed offerings for bidders or brokers. The proposed offerings are input into the offering database (52), which are then retrieved by the administrator using his administrator console (56).

The administrator authorizes the proposed offerings and makes a note or change in the offering database records to indicate such authorization.

During the open bidding process, the brokers or bidders may use their consoles, such as web browser personal computers (58), to retrieve their offerings, and to submit bids via the IOS (51). When a broker makes contact with the interactive offering server, his identity is first verified by an Authentication Server (57), according to the preferred embodiment.

In response to the broker's request for products or services offerings, the IOS queries the offering database (52) and presents the broker with offerings which contain items to which he or she is entitled to bid. An authentication server (57) is included in the preferred embodiment so as to allow the interactive offering server to authenticate the broker prior to presenting any offerings to the broker. As such, the general architecture (59) as shown in FIG. 5 provides each broker with one or more offerings which have been authorized.

Figure 6:
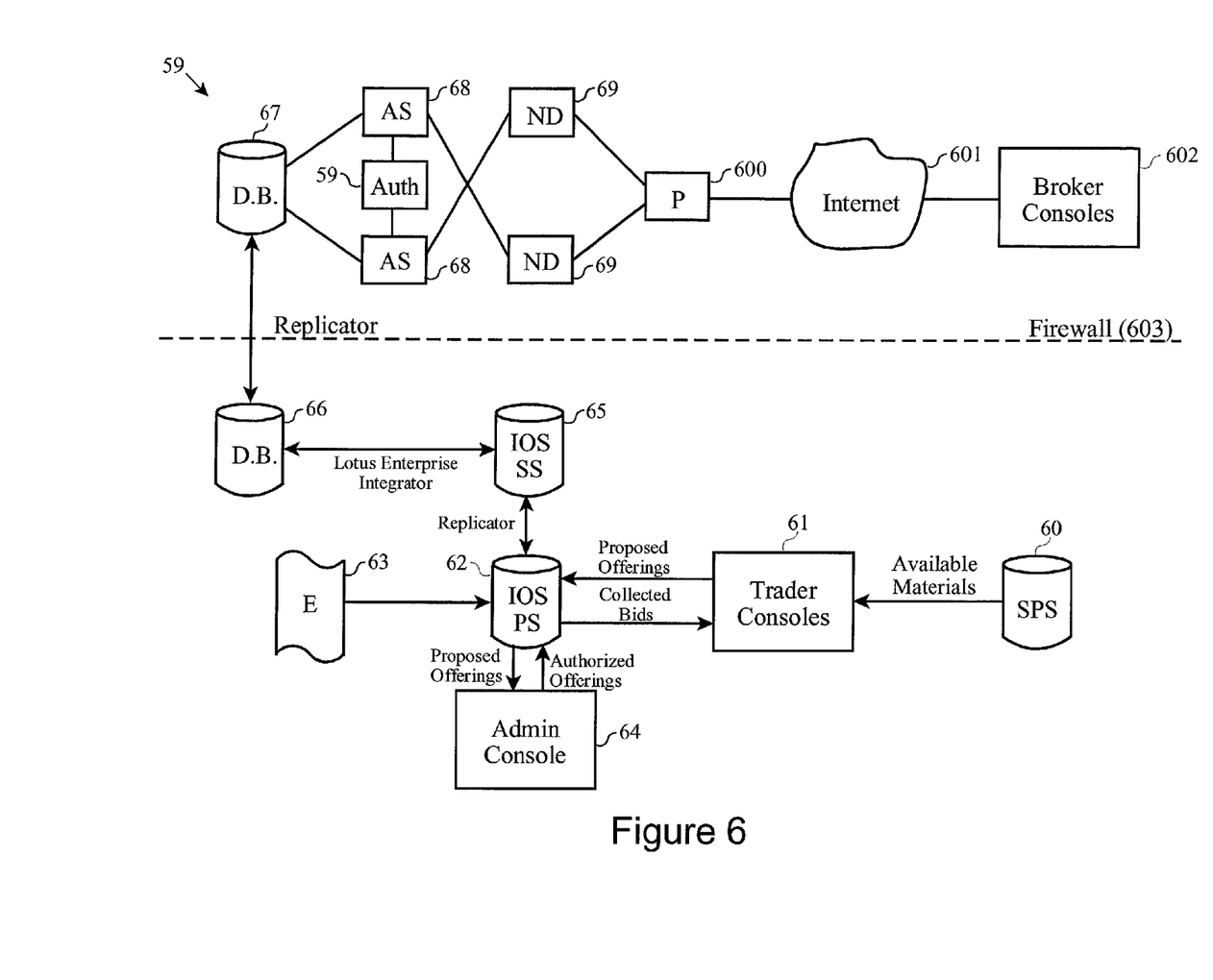
FIG. 6 sets forth the preferred embodiment of the system of the invention.

Turning to FIG. 6, the detailed organization of the system according to the preferred embodiment is shown. A sales preparation system (60) comprising an IBM Lotus Notes system provides available materials list to the traders via their trader consoles (61), which are networked personal computers also running Lotus Notes applications. These available materials lists could alternatively be simple text file lists or spreadsheets, as well as database records. Alternatively, the trader consoles (61) may be dedicated computer consoles, web browser computers, or other appropriate computer user interface devices such as wireless web browsers.

Using a trader console, a trader then filters the available materials list for each broker or bidder to prepare proposed broker offerings to be stored in the IOS production server (62).

An administrator may use an administrator's console (64) to query the database of the IOS production server (62) to retrieve and review a trader's proposed offerings. He may authorize all or some of the proposed offerings, and place those authorized offerings in the IOS database for replication to the IOS staging server (65).

Posting of the authorized offerings to the IOS staging server (65) is preferably done by a Lotus Notes replicator function. As both the IOS production server (62) and staging server (65) are based on IBM Lotus Notes systems in the preferred embodiment, the replicator is a natural function of Lotus Notes which is easily incorporated and maintained. An IBM Lotus Enterprise Integrator ("LEI"), formerly known as "Notes Pump", then prepares a DB2 database file (66) from the IOS staging server (65).

Further according to the preferred embodiment, all of these previously described systems and components and processes are executed and placed behind a protective data "fire wall" (603) for system security. The posted available offerings for the brokers are replicated to another database outside the firewall, preferably in a DB2 format (67) again. This "outside" database is available for query by at least one application server (68).

Also according to the preferred embodiment, a clustered pair of application servers (68) are used to query the outside database (67) for available offerings for brokers. The application servers are provided requests from the brokers via network dispatchers (69). The network dispatchers (69) receive broker requests for offerings by a proxy server (600). Thus, the brokers may use their broker consoles (602), such as web browser personal computers or wireless web browsers, to query the outside database (67) via a computer network (601) such as the Internet.

The network dispatchers provide balanced loading to the application servers (68), and they provide for redirection of requests to one of the application servers should the other application server experience a failure. After the brokers receive their offerings of entitled materials or services on which they may bid via their broker consoles (602), they may post bids which are stored in the outside database (67).

The posted bids are then replicated from the outside database (67) to the inside database (66) behind the firewall. The LEI then moves those bids, converts them from DB2 format to Lotus Notes format, and stores them in the IOS staging server (65). These bids are further replicated from the Lotus Notes format in the IOS staging server (65) to the IOS production server (62), where they then may be retrieved and reviewed by the traders using the trader consoles (61). Thus, the entire offering-to-bid process is completed. The traders may then choose to accept or reject each posted bid.

According to the preferred embodiment, the application servers (68) are web server hardware platforms, such as IBM RS6000 computers running the IBM AIX operating system, accompanied by the IBM WebSphere product. Java servlets are used to interact with the broker console computers (602), which could be alternately realized in such technology as Microsoft's Active Server Pages or Java server pages.

Further according to the preferred embodiment, the application servers are provided with communications capability to an authentication server (57) which may include lists of brokers and passwords against which broker log-in attempts may be validated.

General Proxy Agent Implementation

The preferred embodiment of the invention is as a Java servlet class on the IOS server of the related applications. Alternatively, it can be implemented as an object-oriented class of functions on any suitable auction or offering server. It can be implemented as non-object oriented code, as well.

According to the preferred embodiment, the bids placed by the participants or bidders are enhanced to include additional parameters regarding proxy and timed firing of the proxy. These parameters are passed with the usual bid information to the IOS server, which then instantiates a proxy agent on behalf of that participant or bidder. The proxy agent instance then remains present in memory, and is activated or run periodically by the server, such as once per minute.

Figure 4:
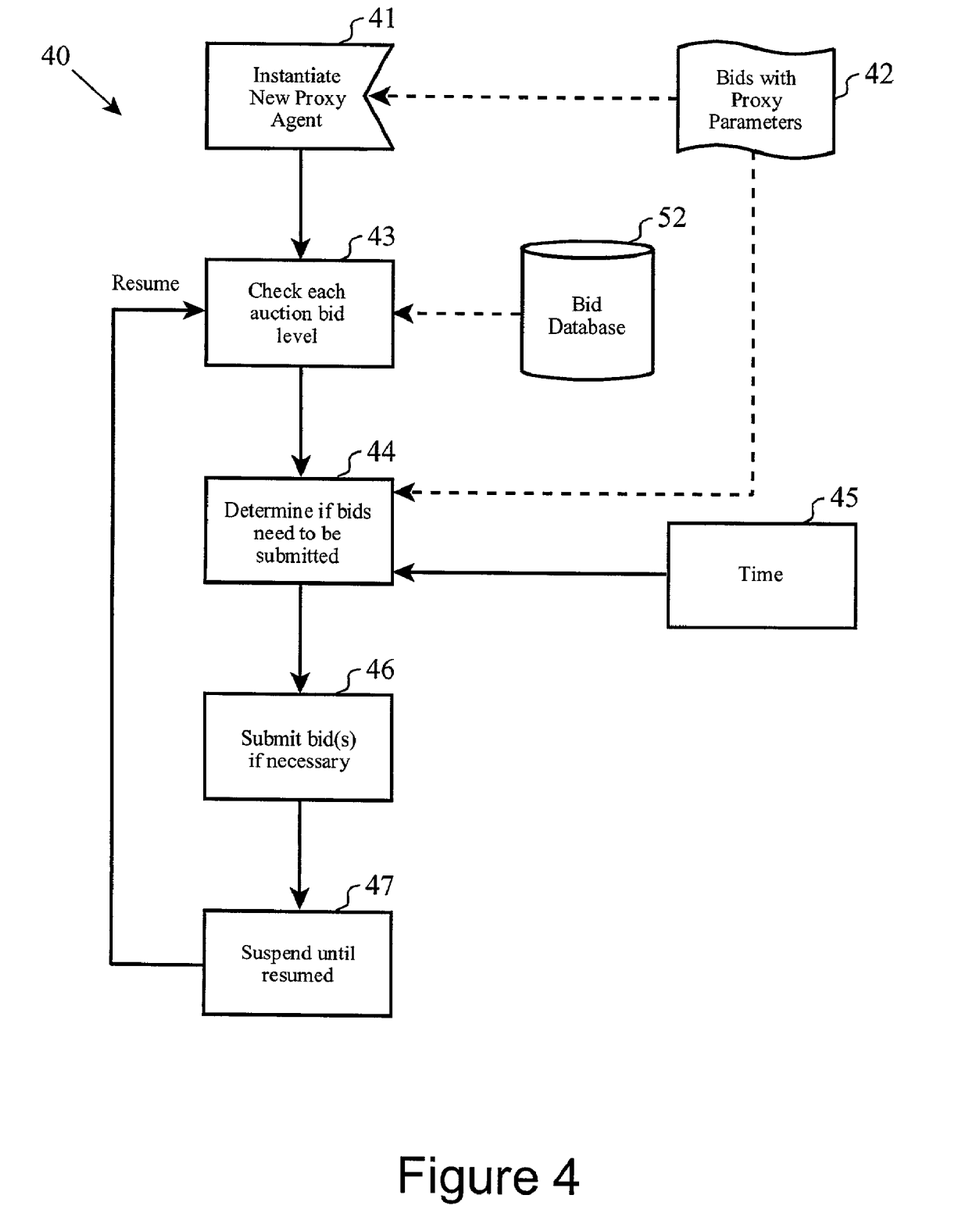
FIG. 4 illustrates the logical flow of the process of the proxy agent.

Turning to FIG. 4, when the proxy agent instance (40) is instantiated (41), it receives the bid parameter set (42) for the bidder or participant. Then, the proxy agent checks (43) each auction's bid level for which it is configured to automatically bid by querying the bid or offer database (52), evaluates (44) the proxy firing parameters in the bid parameter set (42) comparing it with the system time (45), and automatically submits (46) a higher bid or bids, if necessary, to one or more auctions. Then, the proxy agent suspends (47) itself until it is resumed some time later by the auction or offering system, such as one minute later.

This general process allows the inclusion of several optional proxy controls and limits, as discussed in more detail in the following paragraphs.

Delay Paced Proxy Bidding

Table 1 shows the enhanced bid parameter format for placing a bid with delay paced proxy options:

TABLE 1

Bid Parameters with Delay Paced Proxy auction_name="10GB hard drives, SCSI", initial_bid="$10.00", maximum_bid="$45.00", delay_pace="10 min", increment="$1.00" <CR>
auction_name="floppy drives, USB", initial_bid="$2.00", maximum_bid="$6.50", delay_pace="20 min", increment="$0.25" <CR>

According to this example bid, shown in comma separated variable ("CSV") format, the proxy agent would initially place a bid into a specified auction, such as the "10 GB hard drives" auction, for an initial bid value, such as $10.00. It would then periodically monitor the highest bid placed in this auction, wait until no higher bids have been placed for at least a specified delay_pace period, such as 10 minutes, and then place a new bid equal to the current highest bid plus a specified increment, such as $1.00. If the proxy agent reaches its maximum authorized bid, such as $45.00 in this example, it would not place any further bids.

Table 1 shows a second example for an auction for another commodity, paced at 20 minute bid intervals. As such multiple bids for multiple offerings or auctions can be processed by a single proxy agent, given that the periodic resumption rate of the proxy agent instance is equal to or less than the shortest specified bid period. For example, if a bid delay is specified of 30 seconds, the proxy agent preferably is resumed and run at least every 30 seconds or more often.

Scheduled Proxy Bidding

Table 2 shows an example of a bid parameter set which specifies scheduled proxy bidding:

TABLE 2

Bid Parameters with Scheduled Proxy Bidding auction_name="10GB hard drives, SCSI", initial_bid="$10.00",
max_bid="$45.00", until="4:00 PM", max_bid="$55.00", until="6:00 PM",
max_bid="$70. 00", until="close" <CR>

Similar the bid example of Table 1, this bid is formatted in CSV but instead sets a three-period schedule, each period having a different maximum proxy limit. Each time the proxy agent is resumed or run, it will check an auction bid level, such as the "10 GB hard drives" auction, and if it needs to place a higher bid and has not exceeded the bid limit for the current time period, it will place a higher bid. Once it has placed its maximum authorized bid during a time period, the proxy agent will not place any further bids until a new time period with higher limits is entered, or until the close of the auction or offering, whichever occurs first.

Again, similar to the example of Table 1, multiple auctions may be handled by the proxy agent simply by configuring multiple sets of bid parameters into the bid data.

Near-Close ("Last Minute") Proxy Firing

Table 3 shows a configuration of bid parameters which allows the proxy agent to wait until a certain time before closing of the auction to placing higher bids:

TABLE 3

Bid Parameters with Last Minute Proxy Firing auction_name="10GB hard drives, SCSI", initial_bid="$10.00",
max_bid="$45.00", within_close="15 min"<CR>

As in this example, the proxy agent will wait until a specified time before the scheduled close of the auction or offering, such as 15 minutes before closing, and then automatically place bids up to the maximum authorized bid limit, such as $45.00.

Compound Proxy Controls

The preferred embodiment allows for combinations of the three types of proxy controls previously discussed, simply by combining the parameters provided in the bid itself. For example, one bid proxy may be configured to have three schedule periods, each period having a different maximum bid limit and a different delay pace. Further, a bid may be placed with multiple bid periods with multiple limits up to a specified time before closing, at which time another limit is authorized. Table 4 shows examples of these two bid configurations.

TABLE 4

Bid Parameters with Compound Proxy Instructions auction_name="10GB hard drives, SCSI", initial_bid="$10.00",
max_bid="$45.00", until="4:00 PM", delay_pace="10 min",
max_bid="$55.00", until="6:00 PM", delay_pace="5 min",
max_bid="$70.00", until="close", delay_pace="1 min"<CR>
auction_name="floppy drives, USB", initial_bid="$2.00",
max_bid="$4.50", until="4:00 PM",
max_bid="$5.00", until="6:00 PM",
max_bid="$7.00", within_close="15 min"<CR>

Figure 3:
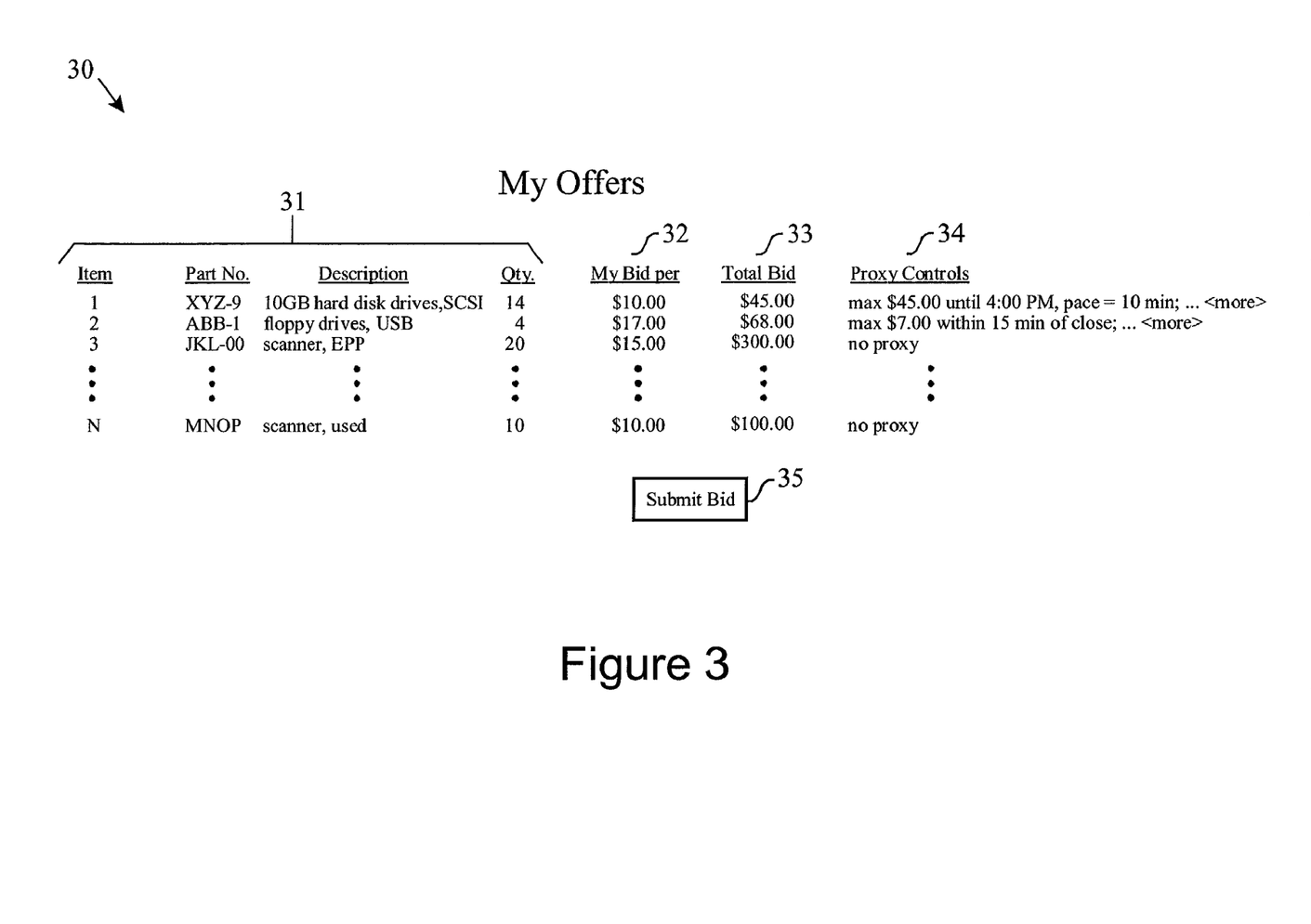
FIG. 3 shows and exemplary user interface dialog for configuring a bid parameter set for a proxy agent managed bid.

FIG. 3 shows an exemplary user interface dialog (30) to allow a bidder or auction participant to specify any or all of these parameters. The user interface dialog (30) allows the bidder or participant to submit basic bid information (31) such as item part numbers and quantities, for one or more items on which he or she wishes to bid. In the preferred embodiment, the user simply inputs a part number, and the description and quantity are automatically filled by the system as the bidding of the preferred embodiment is accepted in "full lots" only. However, in other systems and businesses, partial lot bidding may be allowed, so the user may be allowed to input or overwrite the suggested quantity.

The bidder also indicates an initial bid value (32) per item, which is then multiplied by the quantity to generate a total bid (33) for that item.

To realize the present invention, additional user interface parameters for the proxy controls (34) are provided to the user. In the example of FIG. 3, this may be a language or text field, or alternatively it may be a set of check boxes, radio buttons, drop-down lists, or forms hyperlinked to the dialog (30).

A button or other icon is provided to finalize and submit (35) the bid by transmitting the bid parameter set to the IOS server.

It will be understood by those skilled in the art and from the foregoing description that various modifications and changes may be made in the preferred embodiment of the present invention without departing from its spirit and scope, such as use of or integration to other on-line offering and auction systems, use of alternate bidder consoles and document formats, and implementation using alternate programming languages and methodologies. It is intended that this description is for purposes of illustration only and should not be construed in a limiting sense. The scope of this invention should be defined by the following claims.

What is claimed is:

1. A computer-implemented method for delay paced online proxy bidding comprising:

providing a bid parameter set disposed in computer readable memory of an application server having a plurality of proxy bid parameters, said proxy bid parameters indicating proxy conditions for at least one offering or auction to which proxy automatic bidding is to be made in an automated offering or auctioning system on behalf of an auction bidder, at least one of which parameters includes a counter bid delay value, said proxy bid parameters being specified by said bidder;

automatically checking by an application server computer at least one current bid level in a bid data store in computer readable memory of an online offering or online auction system, said data store having a plurality of electronic bids from online auction participants, said electronic bids being separated in time to form a pace of bidding;

determining by an application server computer that any of said proxy conditions have been met including that said current bid level reflects a current bid placed by an online auction participant other than the bidder for which automated online proxy bidding is being performed; and placing by an application server computer an electronic counter bid into at least one online auction responsive to said proxy conditions being met and a time following or upon the elapse of said counter bid delay from a time of placement of said current bid;

wherein said automatic checking, determining and placing electronic counter bid produce delay paced online proxy bidding according to said counter bid delay value, wherein escalation of said pace of bidding within said auction system is avoided.

2. The method as set forth in claim 1 wherein said determining that any proxy conditions have been met comprises determining by an application server that said current bid level is below an indicated bid maximum parameter in said proxy bid parameters.

3. The method as set forth in claim 2 wherein said determining that said current bid level is below an indicated bid maximum parameter further comprises determining by an application server that a specified time during an auction open period has not been reached yet such that a specified maximum bid may be placed before such specified time.

4. The method as set forth in claim 2 wherein said determining that said current bid level is below an indicated bid maximum parameter further comprises determining by an application server that a specified time prior to an auction close time has been reached such that a specified maximum bid may be placed after such specified time.

5. A computer readable storage memory comprising:
one or more computer readable storage memories suitable for encoding one or more software programs; and
one or more software programs encoded by said one or more computer readable storage memories, configured to cause a processor of an application server computer to:
provide a bid parameter set disposed in computer readable memory having a plurality of proxy bid parameters, said proxy bid parameters indicating proxy conditions for at least one offering or auction to which proxy automatic bidding is to be made in an automated offering or auctioning system on behalf of an auction bidder, at least one of which parameters includes a counter bid delay value, said proxy bid parameters being specified by said bidder;
automatically check at least one current bid level in a bid data store in computer readable memory of an online offering or online auction system, said data store having a plurality of electronic bids from online auction participants, said electronic bids being separated in time to form a pace of bidding;
determine that any of said proxy conditions have been met including that said current bid level reflects a current bid placed by an online auction participant other than the bidder for which automated online proxy bidding is being performed; and
placing an electronic counter bid into at least one online auction responsive to said proxy conditions being met and a time following or upon the elapse of said counter bid delay from a time of placement of said current bid;
wherein said automatic checking, determining and placing electronic counter bid produce delay paced online proxy bidding according to said counter bid delay value, wherein escalation of said pace of bidding within said auction system is avoided.

6. The computer readable storage memory as set forth in claim 5 wherein said determining that any proxy conditions have been met comprises determining that said current bid level is below an indicated bid maximum parameter in said proxy bid parameters.

7. The computer readable storage memory as set forth in claim 6 wherein said determining that said current bid level is below an indicated bid maximum parameter further comprises determining that a specified time during an auction open period has not been reached yet such that a specified maximum bid may be placed before such specified time.

8. The computer readable storage memory as set forth in claim 6 wherein said determining that said current bid level is below an indicated bid maximum parameter further comprises determining that a specified time prior to an auction close time has been reached such that a specified maximum bid may be placed after such specified time.

9. A system comprising:
a bid parameter set disposed in computer readable storage memory having a plurality of proxy bid parameters, said proxy bid parameters indicating proxy conditions for at least one offering or auction to which proxy automatic bidding is to be made in an automated offering or auctioning system on behalf of an auction bidder, at least one of which parameters includes a counter bid delay value, said proxy bid parameters being specified by said bidder;
a bid level checker portion of an application server computer automatically checking at least one current bid level in a bid data store in computer readable memory of an online offering or online auction system, said data store having a plurality of electronic bids from online auction participants, said electronic bids being separated in time to form a pace of bidding;
a condition evaluator portion of an application server computer determining that any of said proxy conditions have been met including that said current bid level reflects a current bid placed by an online auction participant other than the bidder for which automated online proxy bidding is being performed; and
a counter bidder portion of an application server computer placing an electronic counter bid into at least one online auction responsive to said proxy conditions being met and a time following or upon the elapse of said counter bid delay from a time of placement of said current bid;
wherein said automatic checking, determining and placing electronic counter bid produce delay paced online proxy bidding according to said counter bid delay value, wherein escalation of said pace of bidding within said auction system is avoided.

10. The system as set forth in claim 9 wherein said determining by said condition evaluator portion of an application server that any proxy conditions have been met comprises determining that said current bid level is below an indicated bid maximum parameter in said proxy bid parameters.

11. The system as set forth in claim 10 wherein said determining by said condition evaluator portion of an application server that said current bid level is below an indicated bid maximum parameter further comprises determining that a specified time during an auction open period has not been reached yet such that a specified maximum bid may be placed before such specified time.

12. The system as set forth in claim 10 wherein said determining by said condition evaluator portion of an application server that said current bid level is below an indicated bid maximum parameter further comprises determining that a specified time prior to an auction close time has been reached such that a specified maximum bid may be placed after such specified time.

* * * * *